Figure 1:
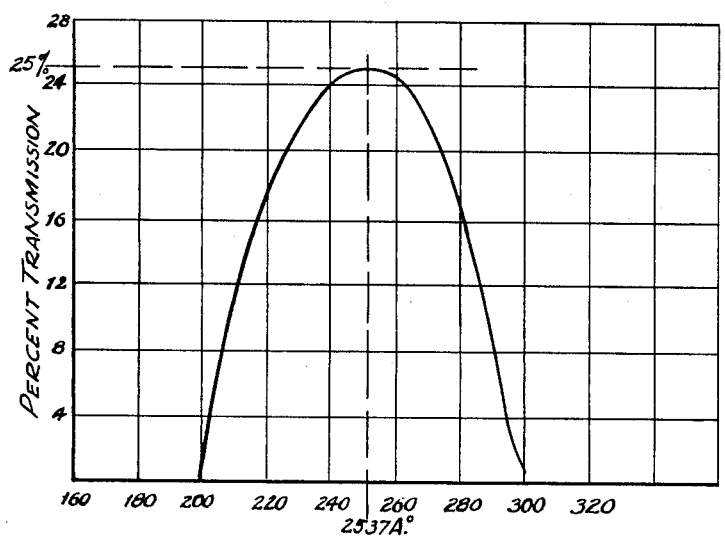

Nov. 6, 1962           E. J. WARNER           3,062,958
                       RADIATION DETECTOR
                       Filed May 20, 1959

INVENTOR
EDWARD J. WARNER
BY Paul S. Martin
ATTORNEY

United States Patent Office 3,062,958
Patented Nov. 6, 1962

3,062,958
RADIATION DETECTOR
Edward J. Warner, East Norwalk, Conn. (% Spectra Electronics Corp., 250 E. 3rd St., Mount Vernon, N.Y.)
Filed May 20, 1959, Ser. No. 814,425
6 Claims. (Cl. 250—83.3)

The present invention relates to detectors for short wave-lengths of ultraviolet light, and particularly for measuring the germicidal radiation from mercury-vapor lamps.

The effectiveness of germicidal lamps, "sun" lamps, and the like devices depends upon mercury-vapor radiation at the 2537 A wave-length. For evaluating this effectiveness, a form of detector has been used that combines the visible-light sensitivity of a photovoltaic cell, such as a selenium cell, with the properties of a phosphor that converts the mercury ultraviolet radiation into visible light that the photovoltaic cell detects. Such a conversion, while providing usefully high-level output from a cell, has a number of serious disadvantages. One of these is that the sensitivity of the combination tends to degenerate. The effectiveness of the phosphor is progressively reduced because of deterioration that results from exposure to this ultraviolet light. This effect is so prominent that at times it actually can upset a sequence of measurements taken over a period of time in an experiment. A second disadvantage is the non-linearity of the conversion achieved by the phosphor. It is readily apparent that for moderate levels of incident ultraviolet radiation the phosphor emits substantial amounts of visible light; but where the ultraviolet intensity increases greatly, there is only a moderate increase in the visible light output. The curve of incident ultraviolet light versus emitted visible light resembles a typical saturation curve, involving a steep slope for moderate levels of incident radiation, levelling off so that there is little further increase in visible light output despite substantial increases in the incident ultraviolet intensity.

Accordingly, an object of the present invention resides in the provision of a new form of detector sensitive to the mercury-vapor ultraviolet wave-length of 2537 A. More specifically, the present invention aims at providing a portable, rugged, long-lived, and relatively inexpensive detector for the germicidal ultraviolet radiation of mercury-vapor lamps. A feature of the present invention resides in the provision of a novel photovoltaic detector for the germicidal ultraviolet wave-length of mercury-vapor lamps, this detector providing high sensitivity at that wave-length while at the same time minimizing response to substantially longer wave-lengths. An additional object of the invention resides in the provision of a novel photovoltaic detector that produces direct conversion to electrical output and does not depend on a phosphor or the like.

As will be seen in the illustrative disclosure of a specific presently preferred embodiment that appears below, a selenium barrier-layer cell is employed in the novel detector. Selenium barrier-layer cells have been advertised for so-called "ultraviolet response" by at least one manufacturer of such cells. However, in published characteristics of such devices, the ultraviolet sensitivity curve discontinues where the wave-length decreases to 400 millimicrons, the extrapolated curve in broken lines dropping sharply for shorter wave-lengths. No performance is suggested by such published curve below 350 millimicrons.

In contrast to such performance, the present invention provides a radiation detector that is sensitive in the region from 200 to 300 millimicrons, the sensitivity being gone at 200 millimicrons and dropping to a mere 1% at 300 millimicrons. A 25% sensitivity is realized (compared to the sensitivity of the cell without a filter) at the 2537 A. wave-length.

The performance of the novel detector in the short ultraviolet region may be attributed to the avoidance of varnish and like substances that are used for protection of the delicate front surface of the barrier-layer photovoltaic cell. By excluding such varnish coating from the active electrode structure of the barrier-layer cell and utilizing a filter for the added purpose of providing surface protection, the new characteristics are imparted to novel commercial selenium barrier-layer cells.

The barrier-layer cell, with its bare active surface and its protective filter, has a high sensitivity to the germicidal ultraviolet wave-length of mercury-vapor lamps. Additionally it can be utilized with usual microammeters in such a way as to provide a high degree of linearity of incident ultraviolet light versus meter reading, over a wide range of incident light intensity.

Figure 2:
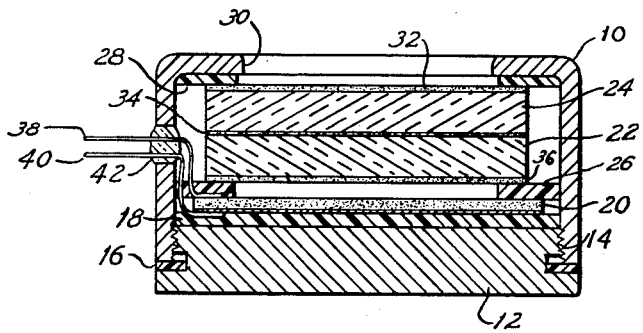

The nature of the invention and its further advantages and features of novelty will be better apparent from the following detailed description and discussion of an illustrative embodiment of the invention shown in the accompanying drawings. In the drawings, which form part of this disclosure:

FIG. 1 is the curve of spectral response of a detector in accordance with the present invention; and FIG. 2 is the enlarged lateral cross-section of a detector embodying features of the invention.

Referring first to FIG. 2, an enclosure is shown including a cup 10 and a cover 12 as of metal, those two parts being joined to each other by screw threads 14 and having a seal therebetween. Gasket 16 as of neoprene or the like may be used for this purpose. On the cover 12 there is a cushion 18 of resilient material such as neoprene. Supported on this cushion is a photovoltaic selenium barrier-layer cell 20, to be discussed further below.

A filter including a lower substrate 22 and an upper substrate 24 is confined between the top of inverted cup 10 and the barrier-layer cell 20. A mask 26 as of neoprene or other synthetic rubber that is virtually immune to deterioration due to ultraviolet light is interposed between the front surface of cell 20 and the back of the filter including substrates 22 and 24. A further gasket 28 is interposed between the cup 10 and the upper substrate 24. A window opening 30 is provided in cup 10, and similar aligned openings are provided in mask 26 and gasket 28, so that radiation entering window opening 30 and passing through the filter will reach the sensitive surface of cell 20.

The filter is built up of the two coated substrates 22 and 24. A front coating 32 on substrate 24 blocks visible radiation. This is supplemented by vapor-deposited interference films 34 and 36 on other surfaces of substrates 22 and 24. Incidentally, substrates 22 and 24 must be relatively transparent to the 2537 A wave-length, and may be of quartz or "Viscor." Substrates of such materials are virtually opaque to wave-lengths below 200 millimicrons.

As seen in FIG. 1, the spectral response curve of the device in FIG. 2 varies from no response at 200 millimicrons up to a maximum of 25% at 2537 A, and for longer wave-lengths the response drops sharply to 1% at 300 millimicrons. These percentages are the portion of the total response that would be obtainable from the cell with a bare active surface and with no filter.

Cell 20 is largely of conventional form, having a specially prepared selenium layer on a metal base electrode, a barrier-layer of molecular thickness on the selenium layer, and a transparent electrode on the barrier-layer. A pair of wires 38 and 40 are joined to the electrodes at the opposite faces of the barrier-layer cell, and these wires extend through a suitable insulating seal 42 in the wall of cup 10.

A selenium cell of this type can have high output for relatively low levels of germicidal ultraviolet radiation with high output impedance. Its characteristic of light versus output is logarithmic. However, where the external load impedance is relatively low, the apparent output is reduced but a very high order of linearity can be obtained, with a deviation from linearity as small as plus or minus 1%. In an example of such a cell in the assembly illustrated in FIG. 2, a rectangular photovoltaic selenium barrier-layer cell 20 of 0.78 square inch effective area, when irradiated by an energy density of 60 microwatts per square centimeter at a wave-length of 2537 A developed an output current of 27.2 microamperes into a 250-ohm load.

The unit in FIG. 2 has many highly desirable characteristics. It is quite small and compact, and unlike the known ultraviolet detector which employs a phosphor, the materials in this device are substantially immune to deterioration by germicidal ultraviolet radiation from a mercury-vapor lamp. The cell itself has been found to have long fatigue life; and, sealed as it is, it is immune to attack by toxic atmospheres and it is protected against condensation of films such as might impair its sensitivity. The only exposed surface, filter layer 32, can easily be cleaned with only reasonable care.

Film-coated substrate 22 and the sensitive face of photocell 20 are spaced from each other by mask 26. This is effective to guard against mutual damaging effects of the cell 20 and film 36 when subjected to mechanical shock or vibration, and inasmuch as mask 26 provides a seal about that space, the sensitive face of cell 20 and interference film 36 are both protected against deposit of films thereon and against exposure to toxic, deleterious atmospheres. Filter 33—24—32—34—36, the metal enclosure 10—12, and the various gaskets of neoprene or other forms of synthetic rubber are substantially immune to the notorious deteriorating effects of ultraviolet radiation on natural rubber and many other materials. This filter having rigid substrates replaces the nominally transparent varnish coating on the light-sensitive surface of commercial selenium barrier-layer cells and at the same time imparts the sharply selective spectral response curve desired for evaluating the effectiveness of mercury-vapor lamps. It should be noted that mercury-vapor lamps frequently include argon and neon, and accordingly they do emit visible light and long wave-lengths of ultraviolet; but such additional radiation is not effective for germicidal purposes. Sharp exclusion of those other contributions to the total photocell output is therefore important in making measurements to appraise the performance of such a lamp.

In the device shown in the drawing, the enclosure including the cup 10 and the cover 12 are sealed to each other by a threaded and gasketed joint. This is obviously purely illustrative, inasmuch as suitably united metal parts may similarly provide a seal without resort to a gasket. Additionally, a tubulation may be provided for evacuating the enclosure, and for refilling it with any desired inert gas. Other modifications and varied applications of the novel concepts and the disclosed device will readily occur to those skilled in the art after having reviewed the foregoing specification. Consequently, the invention should be broadly construed, in accordance with its full spirit and scope.

What is claimed is:

1. A radiation detector that is sensitive selectively to the ultraviolet emission of mercury-vapor lamps, including a sealed enclosure having a window opening, a selenium barrier-layer photovoltaic cell therein having the radiation-sensitive face thereof left bare and disposed to face said window opening, a multiple-layer filter disposed between said window opening and the radiation-sensitive face of the barrier-layer cell, said filter including plural substrates of quartz plates and multiple films including a visible-light blocking film and multiple interference films at opposite faces of the substrates effective in combination to reject radiation of wave-lengths longer than 300 millimicrons, a mask of neoprene spacing the radiation-sensitive face of the selenium barrier-layer cell from the opposed surface of the filter and forming a seal about the space between said filter and said cell, a neoprene gasket between the window opening and the opposed surface of the filter peripherally of the window opening, a cushion of neoprene underlying said cell, said enclosure being formed to press tightly together said cushion, said cell, said mask, said filter and said gasket, and terminal leads having hermetic sealing means in the wall of said enclosure and extending to the opposite terminals of said selenium barrier-layer cell.

2. A radiation detector that is sensitive selectively to the ultraviolet emission of mercury vapor lamps, including a sealed enclosure having a window opening, a selenium barrier-layer photovoltaic cell therein having a bare radiation-sensitive face facing said window opening, a multiple-layer filter disposed between said window opening and the radiation-sensitive face of said barrier-layer cell, said filter including plural ultraviolet-transparent substrates and multiple interference films on opposite surfaces thereof effective in combination to reject radiation of wave-lengths longer than 300 millimicrons, a resilient mask of synthetic rubber spacing the radiation-sensitive face of the selenium barrier-layer cell from the opposed surface of the filter and forming a seal about the space therebetween, a synthetic rubber gasket sealed between the window opening and the surface of the filter peripherally of the window opening, and a cushion of synthetic rubber supporting said selenium barrier-layer cell, said enclosure tightly confining the foregoing enclosed elements and thereby sealing the synthetic rubber elements against the elements engaged thereby.

3. A radiation detector that is sensitive selectively to ultraviolet radiation in the 200 to 300 millimicron band, including an enclosure having a window opening, a selenium barrier-layer photovoltaic cell therein having the radiation-sensitive face thereof exposed and directed toward said window opening, a multiple-layer filter disposed between said window opening and the radiation-sensitive face of said barrier-layer cell, said filter including plural ultraviolet-transparent substrates and plural interference films on the substrates effective in combination to reject radiation wave-lengths longer than 300 millimicrons and having a pass band peaked at about 2537 A, and a mask of synthetic rubber spacing the radiation-sensitive face of the selenium barrier-layer cell from said filter and forming a seal about the space between said filter and said cell.

4. A radiation detector that is sensitive selectively to ultraviolet radiation in the 200 to 300 millimicron band, including an enclosure having a window opening, a selenium barrier-layer photovoltaic cell therein having the radiation-sensitive face thereof left bare and directed toward said window opening, and a filter consisting of plural ultraviolet-transparent substrates bearing films including multiple interference films effective in combination to reject radiation of wave-lengths longer than 300 millimicrons, and spacing means separating said cell from said filter and forming a peripheral seal therebetween.

5. A radiation detector that is sensitive selectively to ultraviolet radiation in the 200 to 300 millimicron band, including a selenium barrier-layer photovoltaic cell having the radiation-sensitive face thereof left bare, and a multiple-layer filter covering said sensitive face of said barrier-layer cell but spaced therefrom, said filter including plural rigid ultraviolet-transparent substrates and a visible-light blocking film and multiple interference films on successive surfaces of said substrates, said filter being effective in combination to reject radiation wave-lengths longer than 300 millimicrons, and means forming a spacer and a peripheral seal between said cell and said filter.

6. A radiation detector that is sensitive selectively to ultraviolet emission in the 200 to 300 millimicron band, including a sealed enclosure having a window opening, a filter of rigid material covering said window opening and sealed thereto and being of a form that is selectively effective for rejecting wave-lengths outside said band, and a selenium barrier-layer photovoltaic cell in said enclosure and having a bare radiation-sensitive surface disposed opposite to but spaced from said filter.

References Cited in the file of this patent

UNITED STATES PATENTS

| | | |
|---|---|---|
| 2,015,431 | McIlvaine | Sept. 24, 1935 |
| 2,382,220 | Fogle | Aug. 14, 1945 |
| 2,565,151 | Taylor | Aug. 21, 1951 |
| 2,758,712 | Linderman | Aug. 14, 1956 |

OTHER REFERENCES

Portable Meters for the Measurement of Light and Ultraviolet Energy, by Luckiesh et al., General Electric Review, vol. 44, No. 4, April 1941.

Technical Data, published by Emby Products Co., 1800 West Pico Street, Los Angeles, Calif., 1942, entitled Photo Electric Cells.